United States Patent Office 3,773,857
Patented Nov. 20, 1973

3,773,857
POLYURETHANE WITH COPOLYMERS OF DIALKYL AMINO ALKYL ACRYLATES OR METHACRYLATES
Kunio Kondo, Kiyoshi Ichikawa, and Yasuji Nakahara, Moriyamashi, Japan, assignors to Asahi Kasei Kogyo Kabushiki Kaisha
No Drawing. Filed May 17, 1972, Ser. No. 254,226
Claims priority, application Japan, May 19, 1971, 46/33,309
Int. Cl. C08g 41/04
U.S. Cl. 260—859 R          8 Claims

ABSTRACT OF THE DISCLOSURE

Polyurethane compositions having improved stability to discoloring into yellowish color and to stickiness are provided by mixing 100 parts by weight of a polyurethane with from 0.5 to 15 parts by weight of a vinyl copolymer obtained by reacting a compound (A) selected from the group consisting of styrene, α-methylstyrene, vinyl chloride and α-methylvinyl chloride with a compound (B) represented by the general formula of

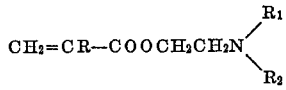

wherein R is hydrogen or $CH_3$, and $R_1$ and $R_2$ are individually $CH_3$ or $C_2H_5$, and having a mol ratio of composition of $B/A+B$ in the range of 0.15 to 0.80 and also an intrinsic viscosity as measured in benzene at 25° C., in the range of 0.05 to 0.70.

DESCRIPTION OF THE INVENTION

This invention relates to polyurethane compositions having improved properties against discoloring into yellowish color and stickiness. More particularly this invention relates to polyurethane compositions comprising a mixture consisting of 100 parts by weight of a polyurethane with from 0.5 to 15 parts by weight of a vinyl copolymer obtained by reacting a compound (A) selected from the group consisting of styrene, α-methylstyrene, vinyl chloride and α-methylvinyl chloride with a compound (B) represented by the general formula of

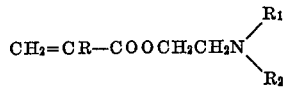

wherein R is hydrogen or $CH_3$ and $R_1$ and $R_2$ are individually $CH_3$ or $C_2H_5$, and having a mol ratio of composition of $B/A+B$ in the range of 0.15 to 0.80 and also an intrinsic viscosity as measured in benzene at 25° C., in the range of 0.05 to 0.70.

In general, when shaped articles in which polyurethane is used totally or in part, are kept for a long time after production, they tend to discolor into yellow and lose their characteristic tensile strength and elongation. They result in spoiling of appearance and characteristic mechanical properties of polyurethene products, particularly, elastic polyurethane products and drastic reduction in their commercial value. Further, this discoloring to yellow and reduction in mechanical properties are greatly enhanced by sunlight, exhaust gas, etc. when they are exposed to the outdoor air and sunlight. On this account, polyurethane has endured undesirable restrictions as to its application. Especially for products which require whiteness, e.g., for spandex fiber products, discoloration into yellow is a fatal drawback because it means tremendous reduction in their commercial value.

Attempts have been made to add various kinds of stabilizers to polyurethane to overcome these drawbacks. Japanese patent publication No. 19,491/1961 (U.S. Pat. No. 3,175,990) discloses an improvement in the fastness of spandex fibers to discoloring into yellow (which will be hereinafter abbreviated as yellowing) by incorporating a vinyl polymer of N,N-diethyl-β-aminoethyl methacrylate into spandex fibers in an amount of 1–15% by weight. However, the addition of such a stabilizer improves the anti-yellowing property of spandex fibers but gives extremely undesirable property, i.e., inter-filamentary cohesion of spandex fibers which makes difficult the operation of unwinding e.g. unwinding of yarns wound up on bobbin into cheese for the purpose of warping. This tendency becomes greater proportionally from the outer layer of cheese to the intermediate layer and from the intermediate layer to the inner layer. Further, the longer the storing period of cheese, the greater the tendency. When a warping operation is carried out by using such yarns, break of yarns occurs many times at the time of unwinding, brings about a remarkable reduction in operational efficiency and injures the commercial values of the fibers. The above-mentioned cohesion phenomenon of fibers can be reduced to a certain extent by reducing the amount of addition of said vinyl polymer to less than 1% by weight. On the other hand, the effectiveness for preventing spandex fibers from yellowing is reduced and the addition of said vinyl polymer becomes meaningless.

Accordingly, it is an object of the present invention to provide polyurethane compositions, particularly polyurethane compositions usable for spandex fibers, which do not discolor, have superior fastness to yellowing, do not bring about inter-filamentary cohesion and exhibit superior property to warping.

We have found that the vinyl copolymer (hereinafter abbreviated as CoAB) obtained by reacting a compound (A) selected from the group consisting of styrene, α-methylstyrene, vinyl chloride and α-methylvinyl chloride with a compound (B) represented by the general formula of

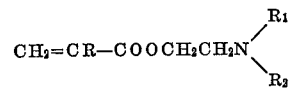

(wherein R is hydrogen or $CH_3$, and $R_1$ and $R_2$ are individually $CH_3$ or $C_2H_5$) gives polyurethanes, particularly those which are used in the application field requiring whiteness, extremely superior effectiveness for preventing them from yellowing and also other undesirable properties such as inter-filamentary cohesion, etc. when the copolymer is incorporated into the polyurethanes, and completed the compositions of the present invention.

To produce said CoAB, one or more kinds of the respective compounds, (A) and (B), can be copolymerized by a common method. In this copolymerization, any of the polymerization modes such as bulk, solution, suspension, emulsion ones, etc. can be used. However, it is important that the mol ratio of the compounds (A) to (B) in the copolymer CoAB satisfies the relation of $$B/A+B=0.15-0.80$$

If $B/A+B$ is greater than 0.80, there will be no effectiveness for preventing cohesion and if $B/A+B$ is smaller than 0.15, the effectiveness for preventing yellowing will be slight. Further, even when the intrinsic viscosity of the copolymer as measured in benzene at 25° C., is about 0.01, the copolymer exhibits sufficient effectiveness, but, since the copolymer of such viscosity has a relatively lower flow temperature, there is a danger of the composition being washed away at the time of processing of scouring, etc. Accordingly it is preferable that the copolymer has an intrinsic viscosity of greater than 0.05. As for the upper limit, those up to about 1.0, preferably up to 0.7, are suitable in view of the compatibility thereof with polyurethane.

The compounds (A) include styrene, α-methylstyrene, vinyl chloride and α-methylvinyl chloride. The use of other usual vinyl monomers than the above-mentioned, e.g., acrylonitrile or the like is not preferable because the resultant CoAB is discolored.

The compounds (B) are represented by the general formula of

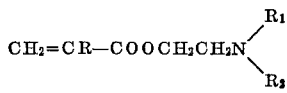

(wherein R is hydrogen or $CH_3$, and $R_1$ and $R_2$ are individually $CH_3$ or $C_2H_5$). Preferable examples of the compounds (B) include N,N-dimethyl-β-aminomethyl acrylate, N,N-diethyl-β-aminoethyl acrylate, N,N-dimethyl-β-aminoethyl methacrylate and N,N-diethyl-β-aminoethyl methacrylate.

The polyurethanes to be used in the compositions of the present invention include all kinds of polyurethanes produced according to any of the conventional methods, but it is convenient to use the product obtained according to the following method. Namely, preferable polyurethane products can be produced by reacting a polymer having active hydrogens at both the terminals and relatively lower polymerization degree, such as polyether, polyester and/or the like, an organic diisocyanate and a chain-extending agent and in the presence or absence of solvent, through one step process or multiple step process to give a polyurethane block copolymer.

As for the polyether, polytetramethylene glycol, polypropylene glycol, polyethylene glycol, etc. are illustrated. As for the polyester, polyethylene adipate, polypropylene adipate, polybutylene adipate, polycaprolactone glycol, etc. are illustrated. The molecular weight of these polymers is preferable to be in the range of 800–4000.

As for the chain-extending agent, diamine, hydrazine, dihydrazide, glycol, aminoalcohol, water, etc. are illustrated. Ethylene diamine, ethylene glycol, ethanolamine, hydrazine and water are preferable.

As for the organic diisocyanate, 4,4'-diphenylmethane diisocyanate is illustrated.

The mixing of a polyurethane and a vinyl copolymer in the production of polyurethane compositions of the present invention can be carried out in the solid state but the mixing in the state of solution is preferable in the point of compatibility.

The mixing amount of CoAB is preferable to be in the range of 0.5–15 parts by weight, particularly 1–10 parts by weight based on 100 parts by weight of polyurethane. The mixing amount less than 0.5 part by weight does not give sufficient effectiveness for the prevention of yellowing. The mixing amount greater than 15 parts by weight reduces the characteristic properties of polyurethane elastomers such as tensile strength, elongation and elastic recovery. The compositions of the present invention may contain other known agents such as stabilizer, pigment, extender, etc. Particularly, the simultaneous use of a known phenolic antioxidant and a U.V. absorber, a far superior effectiveness for the prevention of yellowing can be expected. Particularly, a benzotriazole type U.V. absorber among various known stabilizers have had a tendency of being removed together with a solvent at the time of dry spinning and bleeding from the fibers after being shaped. However, it is surprising that these drawbacks can be overcome when it is used in the compositions of the present invention.

Following examples are given to illustrate the compositions of the present invention but they are not intended to limit the scope of the present invention. All parts and percent shown in these examples are by weight unless otherwise indicated.

REFERENTIAL EXAMPLE

Preparation of the vinyl copolymer

Two parts of pelex OT-P (an anionic surfactant supplied from Kao-Atlas K.K.) was dissolved in 100 parts of water. The resulting solution was flashed with nitrogen for 5 minutes and then 2 parts of styrene and 3.7 parts of N,N-diethyl-β-aminoethyl methacrylate were added to the solution to form an emulsion. After the temperature was elevated to 50° C., 0.54 part of potassium persulfate was added thereto and dissolved in the mixture. When the temperature was further elevated to 70° C., a mixture of 8.4 parts of styrene and 14.8 parts of N,N - diethylaminoethyl methacrylate was continuously added drop-wise with stirring over 30 minutes. After completion of the addition, stirring was continued at 70° C. for one hour to give an emulsion of copolymer. The emulsion thus obtained was diluted to about five times the original weight with water and subjected to salting-out by using 5% calcium chloride aqueous solution to give white powdery copolymer. The yield as measured by weight basis was 97.6%. Nitrogen content was 4.80% (which corresponds to $B/A+B=0.50$) according to elemental analysis. The intrinsic viscosity as measured in benzene at 25° C. was 0.23. A CoAB having a composition other than the above-mentioned can be prepared in the same manner as in the above-mentioned method.

EXAMPLE 1

100.0 parts of polycaprolactone glycol having a molecular weight of 1200 and 31.2 parts of 4,4'-diphenylmethane diisocyanate are mixed with sufficient stirring under the stream of nitrogen gas. The mixture was then maintained at 95° C. for 90 minutes to give a prepolymer having isocyanate radicals at both the terminals, which was cooled at room temperature. Then 183.7 parts of dried N,N-dimethylacetamide (having a moisture content less than 50 p.p.m.) was added thereto to give a uniform solution. Separately, 2.4 parts of ethylene diamine and 0.30 part of dimethylamine were dissolved in 122.4 parts of N,N-dimethylacetamide. To the resulting solution, the above-mentioned prepolymer solution was continuously and drop-wise added at room temperature with stirring. After completion of the addition, stirring was continued for 30 minutes. The polyurethane solution thus obtained had a viscosity of about 3100 poises at 30° C., and the reduced viscosity of 0.5% solution in N,N-dimethylacetamide was 1.21. To the above-mentioned polyurethane solution, 3.0% of the CoAB indicated in Table 1, 5.0% of titanium dioxide and 1.0% of 4,4'-butylidenebis(6-t-butyl-m-cresol), each based upon the solid matter contained in the polyurethane solution, were added and uniformly mixed therewith under stirring. After sufficient defoaming, resultant solution was subjected to dry spinning according to the conventional manner. Resultant 280 denier melt-adhesion multifilament were treated with an oiling agent having a composition consisting of 70% of mineral oil, 15% of silicon-oxyalkylene copolymer, 5% of sorbitan monostearate and 10% of nonyl phenol at the place immediately after the outlet of the spinning cells, and wound up on bobbins. All of the resultant spandex fibers showed a breaking strength of about 0.7 g./d., a breaking elongaton of about 650%, a permanent set of 4.0%, and an amount of oil adhered to the fibers of 5–8% based on the fibers, regardless of the kinds of the copolymers contained in the spandex fibers.

For the purpose of comparison, polyurethane compositions containing CoAB's which do not satisfy the relation of $$0.15 < \frac{B}{A+B} < 0.80$$

(comparative samples 1, 2, 3, and 4) and also polyurethane composition which does not contain CoAB were used to produce spandex fibers having almost the same physical properties according to the similar method. In Table 2, there are shown the results of light-fastness experiment and unwinding experiment of cheese. The light-fastness was estimated by the percentage of maintenance of tenacity and elongation and coloring after exposure to ultraviolet ray for 40 hours in a fadeometer and the unwinding of cheese was indicated by the number of breakage of 1,000,000 m. yarns at an unwinding speed of 50 m./min. and take-up speed of 100 m./min.

Further, acrylonitrile which is one of popular vinyl monomer, was used for a compound (A), and N,N-dimethyl-β-aminoethyl methacrylate was used for a compound (B) to produce a CoAB having a B/A+B of 0.5 and an intrinsic viscosity of 0.22. Elastic yarns produced by using the resultant CoAB as in Example 1, had a yellowish color.

TABLE 3

| | Amount of addition (percent) | Unwinding experiment |
|---|---|---|
| Co-1 | 0.5 | 0.1 |
| | 5.0 | 1.0 |
| | 10.0 | 2.1 |
| Comparative sample 3 | 0.5 | 3.4 |
| | 5.0 | 28.1 |
| | 10.0 | (1) |

[1] Unwinding impossible.

EXAMPLE 3

64.6 parts of polybutylene adipate having a molecular weight of 1560, and 2.57 parts of ethylene glycol were dissolved in 200 parts of dimethylformamide, and 29 parts of 4,4'-diphenylmethane diisocyanate were added

TABLE 1

| | Composition of CoAB | | | |
|---|---|---|---|---|
| Number | Compound (A) | Compound (B) | $\frac{A}{A+B}$ | Intrinsic viscosity |
| Co-1 | Styrene | N,N-diethyl-β-aminoethyl methacrylate | 0.47 | 0.32 |
| Co-2 | do | do | 0.19 | 0.58 |
| Co-3 | do | do | 0.72 | 0.15 |
| Co-4 | do | N,N-dimethyl-β-aminoethyl methacrylate | 0.50 | 0.25 |
| Co-5 | α-Methylstyrene | N,N-diethyl-β-aminoethyl acrylate | 0.53 | 0.19 |
| Co-6 | Vinyl chloride | N,N-dimethyl-β-aminoethyl acrylate | 0.66 | 0.11 |
| Co-7 | do | N,N-diethyl-β-aminoethyl methacrylate | 0.70 | 0.43 |
| Comparative sample: | | | | |
| 1 | Styrene | do | 0.10 | 0.60 |
| 2 | do | do | 0.90 | 0.12 |
| Co-8 | α-Methylvinyl chloride | N,N-dimethyl-β-aminoethyl acrylate | 0.50 | 0.30 |
| Comparative sample: | | | | |
| 3 | | N,N-diethyl-β-aminoethyl methacrylate | 1.0 | 0.15 |
| 4 | Styrene | | 0 | 0.65 |

In Table 1, CoAB prepared according to referential example and comparative samples 1 to 4 were used. The intrinsic viscosities in the table are the values as measured in benzene at 25° C.

TABLE 2

| | Light fastness | | | |
|---|---|---|---|---|
| | Percentage of maintenance of— | | | |
| Number | Tenacity (percent) | Elongation (percent) | Discoloring | Unwinding test |
| Co-1 | 90.0 | 97.0 | None | 0.8 |
| Co-2 | 91.2 | 96.8 | do | 0.1 |
| Co-3 | 98.0 | 101.2 | do | 0.7 |
| Co-4 | 95.4 | 99.1 | do | 1.1 |
| Co-5 | 90.0 | 96.0 | do | 1.9 |
| Co-6 | 81.1 | 88.2 | do | 2.1 |
| Co-7 | 88.4 | 93.1 | do | 0.4 |
| Co-8 | 89.6 | 97.2 | do | 0.9 |
| Comparative sample: | | | | |
| 1 | 59.5 | 61.2 | Yellowing | 0.2 |
| 2 | 85.6 | 94.4 | None | 15.4 |
| 3 | 82.1 | 89.5 | do | 18.5 |
| 4 | 47.5 | 50.0 | Yellowing | 0.3 |
| Sample containing no CoAB | 42.6 | 54.2 | do | 0.1 |

EXAMPLE 2

91.8 parts of polytetramethylene glycol having a molecular weight of 990 and 29.3 parts of 4,4'-diphenylmethane diisocyanate were added to 363.4 parts of dimethylformamide and reaction was carried out at 30° C. for 5 hours. Thereafter 3.15 parts of monoethanol amine and then 6.72 parts of 4,4'-diphenylmethane diisocyanate were added and reaction was carried out with stirring at 30° C. for 30 hours to give a high viscosity solution having a viscosity of 850 poises at 30° C. To the solution were added 5.0% of titanium dioxide, and 0.5%, 5% or 10% of Co-1, and then uniform solutions were prepared. The solutions were subjected to dry spinning according to conventional method to obtain elastic yarns. For the purpose of comparison, elastic yarns containing each 0.5%, 5% or 10% of comparative sample 3 of Table 1 were prepared and subjected to unwinding experiment. The results are shown in Table 3.

to the resulting solution to carry out reaction at 30° C. for 10 hours under the stream of nitrogen. The viscosity of the resultant polyurethane solution was 500 poises. To this solution, 5% of titanium dioxide and 5% of CoAB were added and the resultant solution was subjected to dry spinning according to conventional process to give elastic yarns. For the purpose of comparison, elastic yarns containing 5% of comparative sample 3 were prepared and likewise tested.

When unwinding was carried out at an unwinding speed of 50 m./min., while varying take-up speed, minimum take-up speed, y m./min., at which at least 1000 m. of yarns was unwound without any breakage, was measured. As values indicating easiness of unwinding, values of y/50 are shown in Table 4.

TABLE 4

| CoAB: | y/50 |
|---|---|
| Co-1 | 1.03 |
| Co-2 | 1.01 |
| Co-3 | 1.02 |
| Comparative sample 3 | 1.30 |

What is claimed is:

1. Polyurethane compositions comprising a mixture of 100 parts by weight of a polyurethane with 0.5 to 15 parts by weight of a vinyl copolymer obtained by reacting a compound (A) selected from the group consisting of styrene, α-methylstyrene, vinyl chloride and α-methylvinyl chloride with a compound (B) represented by the general formula of

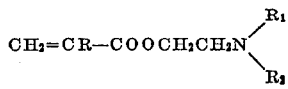

wherein R is hydrogen or $CH_3$, and $R_1$ and $R_2$ are individually $CH_3$ or $C_2H_5$, and having a mol ratio of composition of $B/A+B$ in the range of 0.15 to 0.80 and also an intrinsic viscosity as measured in benzene at 25° C., in the range of 0.05 to 0.70.

2. Polyurethane compositions according to claim 1 wherein said polyurethane is a substantially linear polymer obtained by addition polymerization of a polyether and/or a polyester having active hydrogens at both the terminals and having a molecular weight in the range of 800–4,000, an organic diisocyanate and a chain-extending agent selected from the group consisting of diamine, glycol, aminoalcohol, hydrazine, dihydrazide and water.

3. Polyurethane compositions according to claim 2 wherein said polyether is selected from the group consisting of polytetramethylene glycol, polypropylene glycol and polyethylene glycol.

4. Polyurethane compositions according to claim 2 wherein said polyester is selected from the group consisting of polyethylene adipate, polypropylene adipate, polybutylene adipate and polycaprolactone glycol.

5. Polyurethane compositions according to claim 2 wherein said chain-extending agent is selected from the group consisting of ethylenediamine, ethylene glycol, ethanolamine, hydrazine and water.

6. Polyurethane compositions according to claim 2 wherein said organic diisocyanate is 4,4′-diphenylmethane diisocyanate.

7. Polyurethane compositions according to claim 1 wherein said compound (B) is selected from the group consisting of N,N-dimethyl-β-aminoethyl acrylate, N,N-diethyl-β-aminoethyl acrylate, N,N - dimethyl-β-aminoethyl methacrylate and N,N-diethyl-β-aminoethyl methacrylate.

8. Fiber products produced from the composition of claim 1.

References Cited

UNITED STATES PATENTS

| | | | |
|---|---|---|---|
| 3,175,990 | 3/1965 | Ruehl | 260—41 |
| 3,428,711 | 2/1969 | Hunt | 260—859 |

FOREIGN PATENTS 6407036  12/1964  Netherlands.

PAUL LIEBERMAN, Primary Examiner

U.S. Cl. X.R.

260—77.5 CR, 859 PV